United States Patent
Tanaka

(10) Patent No.: US 11,087,712 B2
(45) Date of Patent: Aug. 10, 2021

(54) DRIVING CIRCUIT, DISPLAY MODULE, AND MOBILE BODY

(71) Applicant: Seiko Epson Corporation, Tokyo (JP)

(72) Inventor: Kazuaki Tanaka, Nagano (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/034,440

(22) Filed: Sep. 28, 2020

(65) Prior Publication Data

US 2021/0097953 A1    Apr. 1, 2021

(30) Foreign Application Priority Data

Sep. 30, 2019  (JP) .............................. JP2019-178580

(51) Int. Cl.
*G09G 3/36* (2006.01)
*G09G 3/00* (2006.01)
*H04M 1/02* (2006.01)

(52) U.S. Cl.
CPC ........... *G09G 3/3696* (2013.01); *G09G 3/006* (2013.01); *H04M 1/0266* (2013.01)

(58) Field of Classification Search
CPC ... G09G 2320/0247; G09G 2320/0257; G09G 2330/021; G09G 2340/0435; G09G 3/2092; G09G 3/36; G09G 3/3614; G09G 3/3648
See application file for complete search history.

(56) References Cited

U.S. PATENT DOCUMENTS

2016/0054830 A1 * 2/2016 Oshita ................ G06F 3/04186
345/17
2017/0285817 A1 * 10/2017 Mori ..................... G06F 3/0412

FOREIGN PATENT DOCUMENTS

| JP | H04-317096 A | 11/1992 |
| JP | H09-005768 A | 1/1997 |
| JP | 2005-049788 A | 2/2005 |
| JP | 2020-106633 A | 7/2020 |

* cited by examiner

*Primary Examiner* — Insa Sadio
(74) *Attorney, Agent, or Firm* — Harness, Dickey & Pierce, P.L.C.

(57) ABSTRACT

A common driver 200 includes a voltage output circuit 160 that outputs an inspection voltage that is different between a first period and a second period to an inspection voltage output line Ld, and outputs a first voltage Va1 to a first segment electrode and a second voltage Va2 to a second segment electrode SE2 in the first period and the second period, a signal output circuit 140 that outputs, to a signal voltage output line Ls, a voltage of a first signal in the first period, and a voltage of a second signal in the second period, and an inspection circuit 170 that inspects whether or not an anomaly is present based on the voltage of the inspection voltage output line Ld and the voltage of the signal voltage output line Ls.

11 Claims, 13 Drawing Sheets

DRIVING CIRCUIT, DISPLAY MODULE, AND MOBILE BODY

The present application is based on, and claims priority from JP Application Serial Number 2019-178580, filed Sep. 30, 2019, the disclosure of which is hereby incorporated by reference herein in its entirety.

BACKGROUND

1. Technical Field

The present disclosure relates to a driving circuit of a display panel.

2. Related Art

The liquid crystal panels include a panel driven that is by active driving and a panel that is driven by static driving. JP-A-2005-49788 discloses an inspection method of a liquid crystal panel that is driven by static driving. In this inspection method, a voltage for turning on is sequentially applied to a plurality of segment electrodes, and whether or not each segment is turned on is visually confirmed.

However, the known inspection method has a problem in that whether or not the liquid crystal panel is properly driven during normal display cannot be inspected.

SUMMARY

A driving circuit according to an aspect of the present disclosure is a driving circuit that drives a display panel including a first electrode and a second electrode. The driving circuit includes: a first voltage generation circuit configured to generate a first voltage to be supplied to the first electrode based on a first signal; a second voltage generation circuit configured to generate a second voltage to be supplied to the second electrode based on a second signal; a first output terminal to be connected to the first electrode; a second output terminal to be connected to the second electrode; a voltage output circuit that is arranged between the first voltage generation circuit and the first output terminal and between the second voltage generation circuit and the second output terminal, includes an inspection voltage output line for outputting a first inspection voltage in order to inspect whether or not the first voltage is applied to the first electrode, and a second inspection voltage in order to inspect whether or not the second voltage is applied to the second electrode, and is configured to, in a first period, output the first inspection voltage to the inspection voltage output line, and not output the second inspection voltage to the inspection voltage output line, and in a second period that is different from the first period, output the second inspection voltage to the inspection voltage output line, and not output the first inspection voltage to the inspection voltage output line; a signal output circuit that includes a signal voltage output line for outputting a voltage of the first signal or a voltage of the second signal, and is configured to, in the first period, output the voltage of the first signal to the signal voltage output line, and not output the voltage of the second signal to the signal voltage output line, and in the second period, output the voltage of the second signal to the signal voltage output line, and not output the voltage of the first signal to the signal voltage output line; and an inspection circuit configured to inspect, in the first period, whether or not an anomaly is present in a path from an input of the first voltage generation circuit to the first electrode, and in the second period, whether or not an anomaly is present in a path from an input of the second voltage generation circuit to the second electrode, based on the first inspection voltage or the second inspection voltage that is output from the inspection voltage output line and the voltage of the first signal or the voltage of the second signal that is output from the signal voltage output line.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
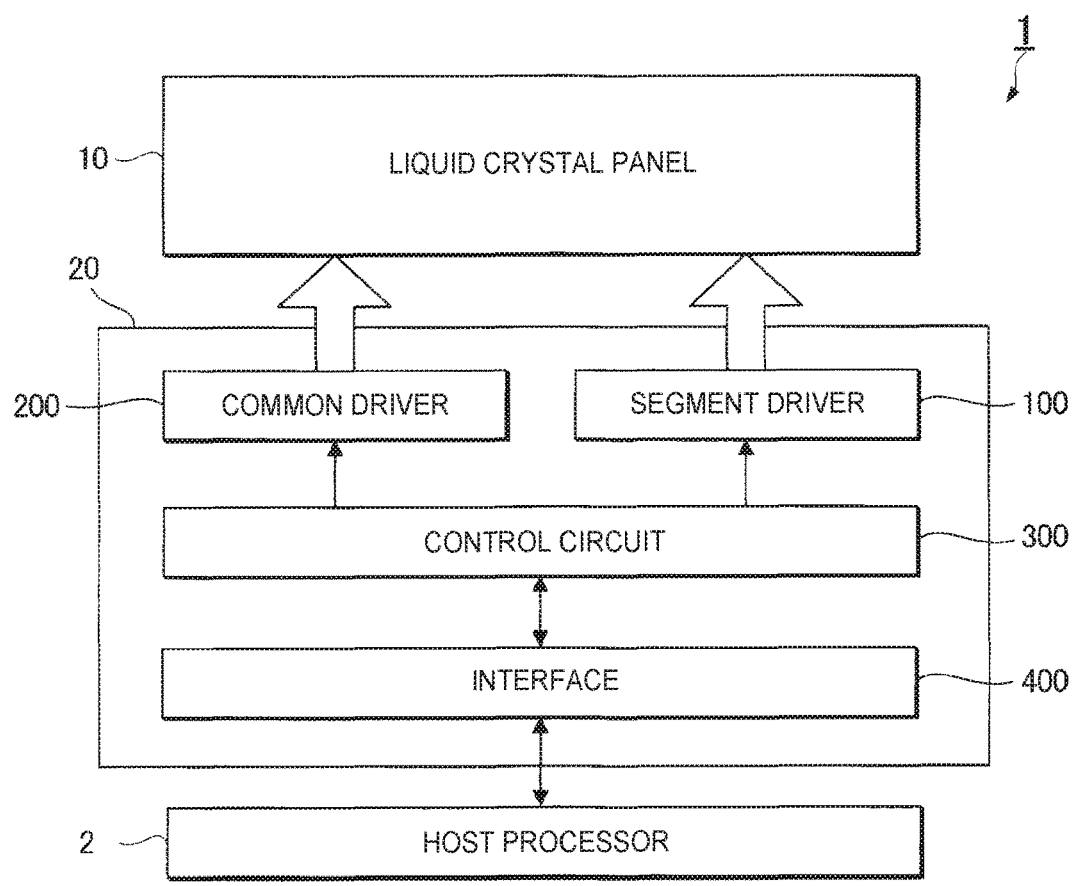
FIG. 1 is a block diagram illustrating a configuration of a display module 1 according to embodiments.

Hereinafter, embodiments will be described with reference to the drawings. Note that, in the drawings, the size and scale of each unit are appropriately changed from the actual size and scale thereof. Also, although the following embodiments are limited in various ways so as to be technically preferable, the embodiments are not limited thereto.

1. Embodiments

1-1. Overall Configuration

FIG. 1 is a block diagram illustrating a configuration of a display module 1 according to embodiments. The display module 1 includes a liquid crystal panel 10, and a driving circuit 20 that drives the liquid crystal panel 10. The display module 1 operates based on signals transmitted from a host processor 2. The host processor 2 is an ECU (Electronic Control Unit), for example. The liquid crystal panel 10 is an example of a display panel that displays an image.

The liquid crystal panel 10 is a panel that is driven by static driving. The liquid crystal panel 10 includes a plurality of segments. The segment is a minimum element for displaying an image. Each segment includes a segment electrode, a common electrode, and liquid crystal that is sandwiched between the segment electrode and the common electrode. The liquid crystal panel 10 is an example of the display panel. In this example, the number of segments is seven. The number of segments of the present disclosure is not limited to seven, and the number of segments need only be two or more.

The driving circuit 20 includes a segment driver 100, a common driver 200, a control circuit 300, and an interface 400.

Input data Din is supplied to the control circuit 300 from a host processor 2 via the interface 400. The input data Din indicates the tone that should be displayed in each segment. The input data Din indicates the tone that should be displayed in each of first to seventh segments. In this example, the number of tones that can be displayed in each segment is eight. Note that the number of tones that can be displayed in each segment is not limited to eight, and may also be any number of two or more.

The input data Din is constituted by a plurality of word data corresponding to the number of segments. The plurality of word data that constitutes the input data Din are in one-to-one correspondence with the plurality of segments. Each word data indicates the tone that should be displayed in the corresponding segment. In this example, since the number of tones that can be displayed in each segment is eight, one word data is constituted by three bits.

The control circuit 300 generates various control signals. The control circuit 300 controls the segment driver 100 and the common driver 200 by outputting the control signals to the segment driver 100 and the common driver 200. The control circuit 300 outputs the input data Din to the segment driver 100.

The segment driver 100 outputs signal voltages to a plurality of segment electrodes provided in the liquid crystal panel 10, respectively. The common driver 200 outputs a common voltage to a plurality of common electrodes provided in the liquid crystal panel 10.

Figure 2:
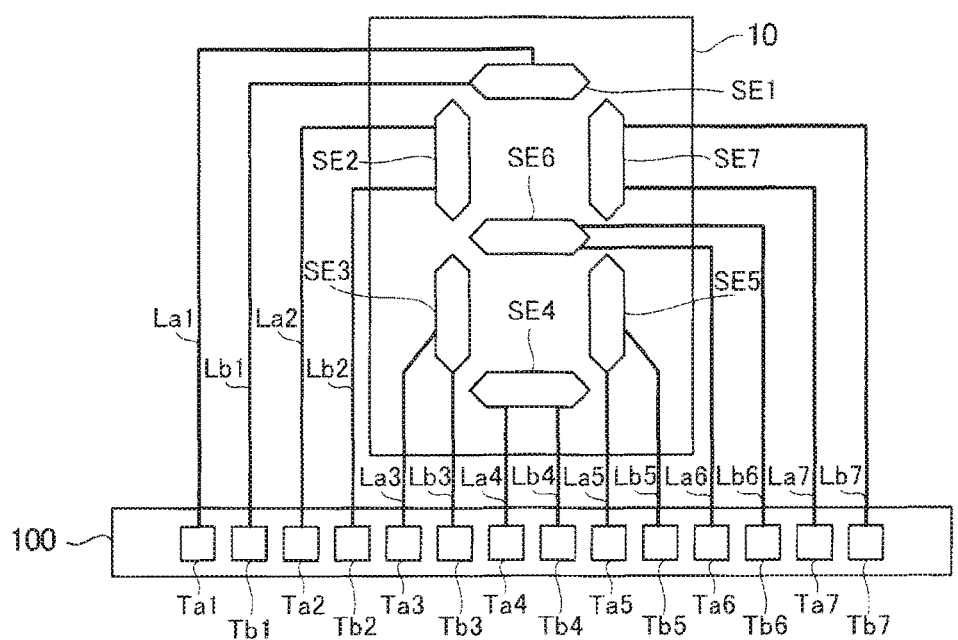
FIG. 2 is a diagram illustrating connection relationship between a plurality of segment electrodes and a segment driver 100.

FIG. 2 is a diagram illustrating connection relationship between the plurality of segment electrodes and the segment driver 100. As shown in FIG. 2, the liquid crystal panel 10 includes first to seventh segment electrodes SE1 to SE7. The first segment electrode SE1 is an example of a first electrode. The second segment electrode SE2 is an example of a second electrode.

The segment driver 100 includes first to seventh output terminals Ta1, Ta2, . . . , and Ta7 and first to seventh monitor terminals Tb1, Tb2, . . . , and Tb7. In the following description, j indicates any number from one to seven. A $j^{th}$ output terminal Taj is to be connected to a $j^{th}$ segment electrode SEj through a $j^{th}$ output line Laj. A $j^{th}$ monitor terminal Tbj is to be connected to a $j^{th}$ segment electrode SEj through a $j^{th}$ monitor line Lbj.

Figure 3:
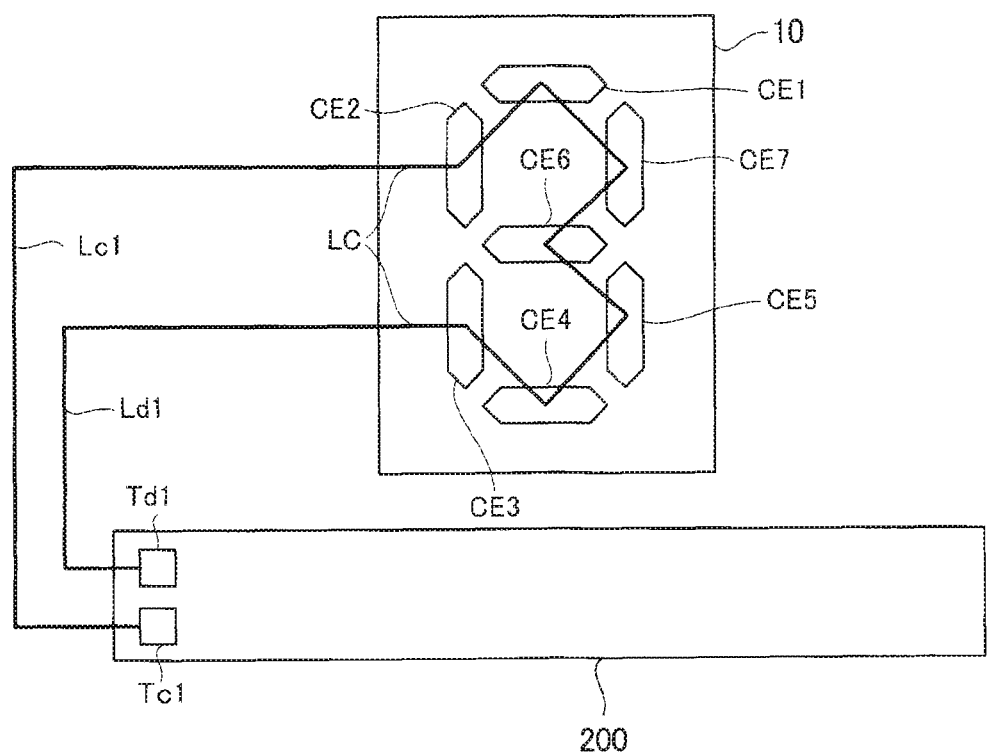
FIG. 3 is a diagram illustrating connection relationship between a plurality of common electrodes and a common driver 200.

FIG. 3 is a diagram illustrating connection relationship between the plurality of common electrodes and a common driver 200. As shown in FIG. 3, the liquid crystal panel 10 includes first to seventh common electrodes CE1 to CE7. The first to seventh common electrodes CE1 to CE7 are connected by a common interconnect LC.

The common driver 200 includes a first output terminal Tc1 and a first monitor terminal TD1. The first output terminal Tc1 is connected to one end of the common interconnect LC through a first output line Lc1. The first monitor terminal TD1 is connected to the other end of the common interconnect LC through a first monitor line LD1.

1-2. Segment Driver

Figure 4:
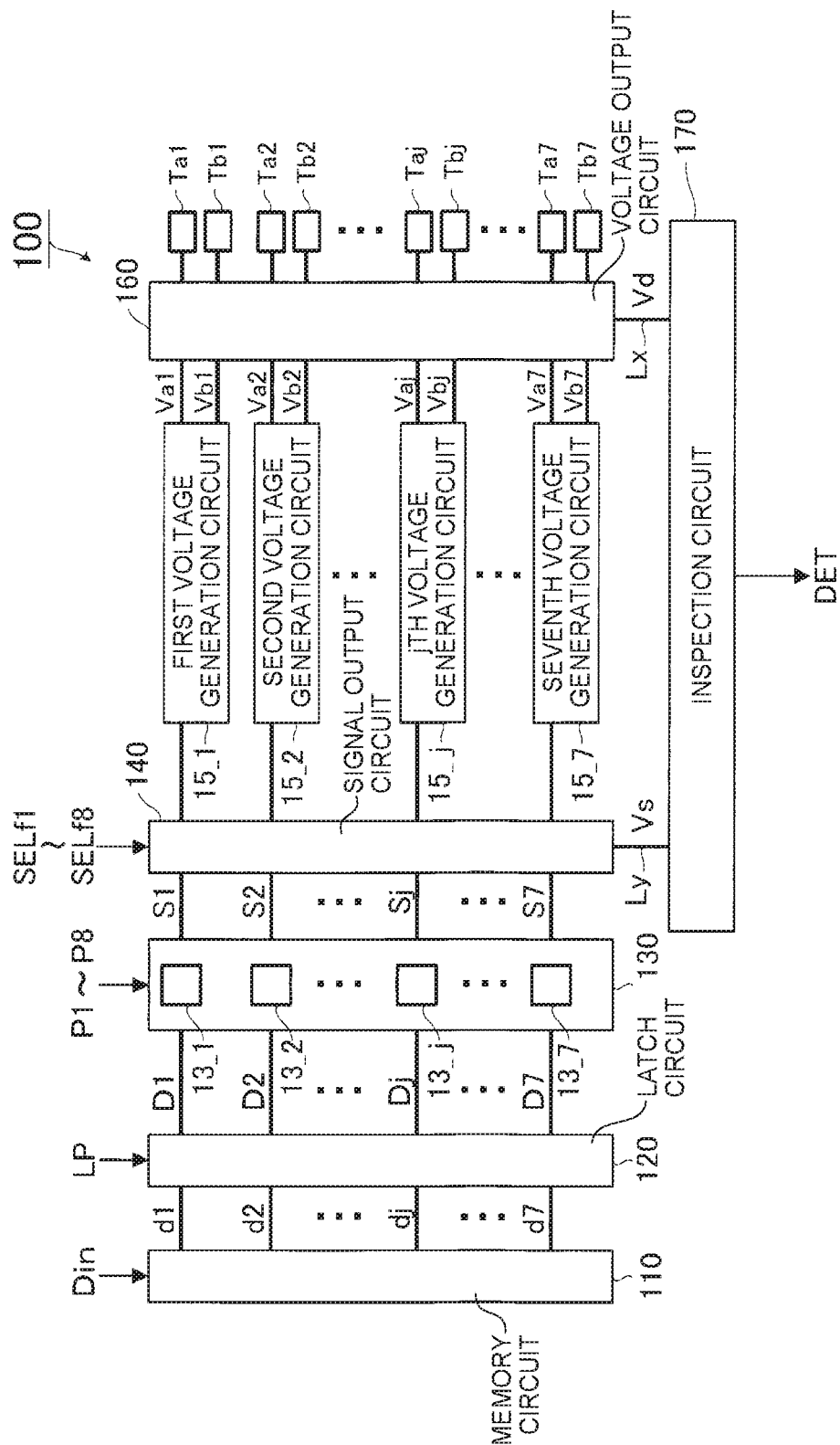
FIG. 4 is a block diagram illustrating a configuration of the segment driver 100.

FIG. 4 is a block diagram illustrating a configuration of the segment driver 100. The segment driver 100 inspects whether it is properly operating while an image is displayed in the liquid crystal panel 10.

The segment driver 100 includes a memory circuit 110, a latch circuit 120, a signal selection circuit 130, a signal output circuit 140, first to seventh voltage generation circuits 15_1 to 15_7, a voltage output circuit 160, an inspection circuit 170, first to seventh output terminals Ta1 to Ta7, and first to seventh monitor terminals Tb1 to Tb7.

The memory circuit 110 stores input data Din, and outputs the stored input data Din to the latch circuit 120. The input data Din in this example is constituted by word data d1 to d7. The memory circuit 110 is constituted by a RAM (Random Access Memory), for example.

The latch circuit 120 latches respective word data d1, d2, . . . , and d7 of the input data Din in synchronization with a latch pulse LP, and outputs the data D1, D2, . . . , and D7, which are a latched result, to the signal selection circuit 130. The data D1 corresponds to first data indicating the tone to be displayed in a region corresponding to the first segment electrode SE1. The data D2 corresponds to second data indicating the tone to be displayed in a region corresponding to the second segment electrode SE2.

The signal selection circuit 130 outputs first to seventh signals S1, S2, . . . , and S7 that are in one-to-one correspondence with the first to seventh segments based on the data D1, D2, . . . , and D7, respectively. The signal selection circuit 130 includes first to seventh selection circuits 13_1 to 13_7. The first selection circuit 13_1 selects one PWM signal from a plurality of PWM signals P1 to P8 based on the data D1, and outputs the selected one PWM signal as a first signal S1. The second selection circuit 13_2 selects one PWM signal from the plurality of PWM signals P1 to P8 based on the data D2, and outputs the selected one PWM signal as a second signal S2. Similarly, the $j^{th}$ selection circuit 13_j selects one PWM signal from the plurality of PWM signals P1 to P8 based on the data Dj, and outputs the selected one PWM signal as a $j^{th}$ signal Sj.

The signal output circuit 140 includes a signal voltage output line Ly. The signal output circuit 140 outputs the voltages of the first to seventh signals S1 to S7 to the signal voltage output line Ly in a time division manner. The signal output circuit 140 outputs the first to seventh signals S1 to S7 to the first to seventh voltage generation circuits 15_1 to 15_7, respectively.

The $j^{th}$ voltage generation circuit 15_j, of the first to seventh voltage generation circuits 15_1 to 15_7, generates a Ph voltage Vaj and a $j^{th}$ voltage Vbj that are to be applied to the $j^{th}$ segment electrode SEj based on the $j^{th}$ signal Sj.

Here, the $j^{th}$ voltage Vaj and the $j^{th}$ voltage Vbj have the same value. The $j^{th}$ voltage generation circuit has redundancy by including two sets of circuits. That is, in the $j^{th}$ voltage generation circuit, when the circuit of one set fails, the other circuit functions as the replacement.

The voltage output circuit 160 outputs the first to seventh voltages Va1 to Va7 and the first to seventh voltages Vb1 to Vb7 to first to seventh output terminals Ta1 to Ta7 and the first to seventh monitor terminals Tb1 to Tb7, respectively. Also, the voltage output circuit 160 includes an inspection voltage output line Lx, and outputs an inspection voltage Vd to the inspection circuit 170.

The inspection circuit 170 inspects whether or not an anomaly is present in a path from an input of the $j^{th}$ voltage generation circuit 15_j to an input of the $j^{th}$ segment electrode SEj based on the inspection voltage Vd output from the inspection voltage output line Lx and the signal voltage Vs output from the signal voltage output line Ly, and outputs an inspection signal DET indicating the inspection result to the control circuit 300.

Figure 5:
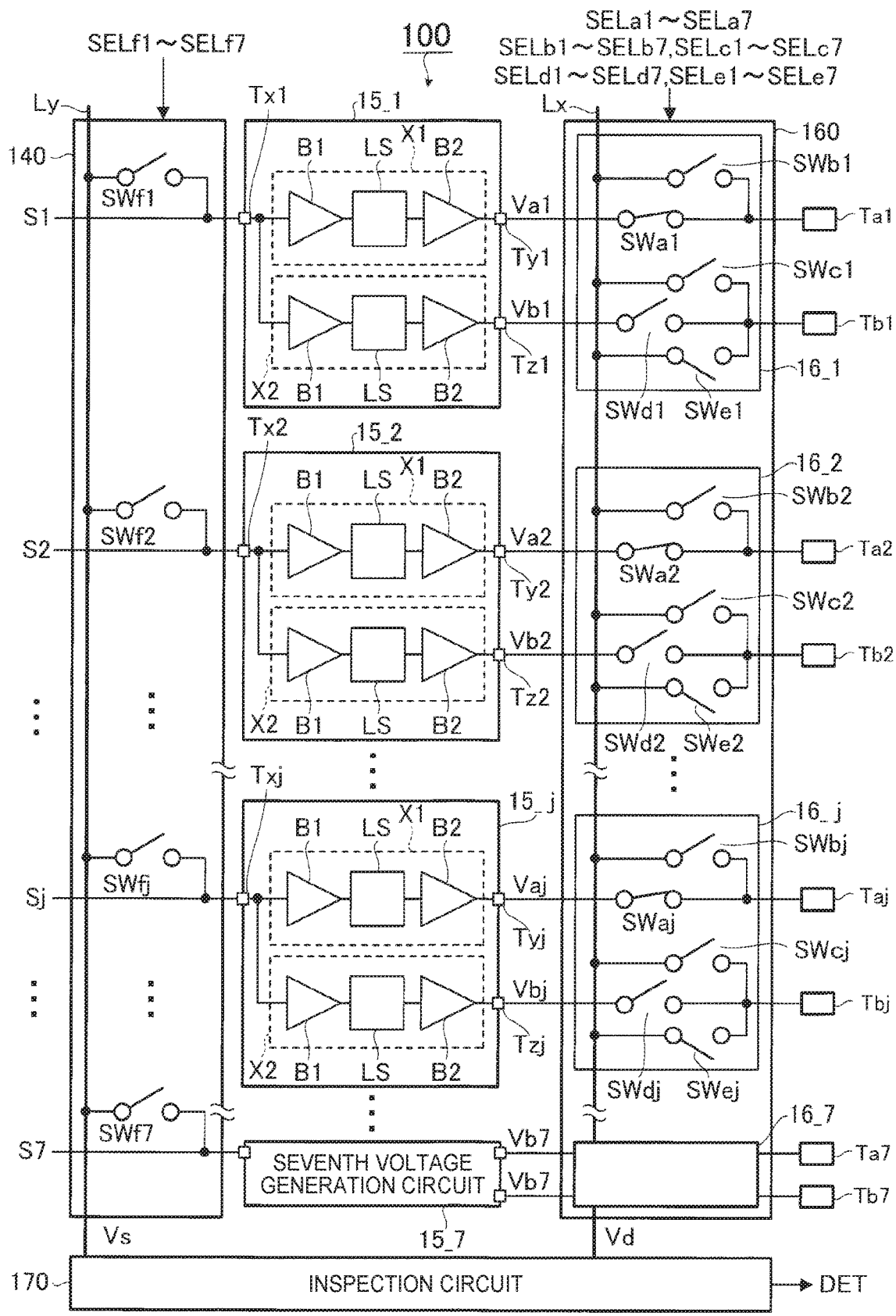
FIG. 5 is a detailed block diagram of a signal selection circuit 130, a signal output circuit 140, first to seventh voltage generation circuits 15_1 to 15_7, a voltage output circuit 160, and an inspection circuit 170.

FIG. 5 is a detailed block diagram of the signal output circuit 140, the first to seventh voltage generation circuits 15_1 to 15_7, the voltage output circuit 160, and the inspection circuit 170. The signal output circuit 140 includes switches SWf1, SWf2, . . . , and SWf7. The switch SWf1 is provided between the signal voltage output line Ly and an input terminal Tx1 of the first voltage generation circuit 15_1. The switch SWf2 is provided between the signal voltage output line Ly and an input terminal Tx2 of the second voltage generation circuit 15_2. The switch SWf1 is an example of a first signal switch. The switch SWf2 is an example of a second signal switch. Similarly, the switch SWfj is provided between the signal voltage output line Ly and an input terminal Txj of the $j^{th}$ voltage generation circuit 15_j. In the following description, the switch is constituted by at least one switching element. One switch includes at least one of an N-channel MOS transistor and a P-channel MOS transistor, for example.

Also, a selection signal SELf1 is supplied to the switch SWf1. A selection signal SELf2 is supplied to the switch SWf2. Similarly, a selection signal SELfj is supplied to the switch SWfj. The switch SWfj is in an on state when the selection signal SELfj is at a first logic level, and is an off state when the selection signal SELj is at a second logic level. For example, the first logic level is a high level, and the second logic level is a low level.

One of the selection signal SELf1 to SELf7 exclusively becomes the first logic level. Therefore, the voltages of the first to seventh signals S1 to S7 are output to the signal voltage output line Ly in a time division manner.

The first voltage generation circuit 15_1 includes a first circuit X1 and a second circuit X2. The first circuit X1 includes a buffer B1, a level shifter LS, and a buffer B2. In the first circuit X1, the level shifter LS level-shifts the output signal of the buffer B1, and outputs the level-shifted output signal to the buffer B2. The buffer B2 of the first circuit X1 outputs the first voltage Va1 through the output terminal Ty1. The second circuit X2 is configured similarly to the first circuit X1. A buffer B2 of the second circuit X2 outputs the first voltage Vb1 through the output terminal Tz1. Similarly, the $j^{th}$ voltage generation circuit 15_j includes a first circuit X1 and a second circuit X2. A first circuit X1 of the $j^{th}$ voltage generation circuit 15_j outputs the $j^{th}$ voltage Vaj through an output terminal Tyj. The second circuit X2 of the $j^{th}$ voltage generation circuit 15_j outputs the $j^{th}$ voltage Vbj through the output terminal Tzj.

The voltage output circuit 160 includes first to seventh voltage output circuits 16_1 to 16_7. The first voltage output circuit 16_1 includes a switch SWa1, a switch SWb1, a switch SWc1, a switch SWd1, and a switch SWe1. The switch SWb1 is an example of a first inspection switch. The switch SWe1 is an example of a first monitor switch.

The switch SWa1 is provided between the output terminal Ty1 and the first output terminal Ta1. The switch SWb1 is provided between the inspection voltage output line Lx and the first output terminal Ta1. The switch SWc1 is provided between the inspection voltage output line Lx and the first monitor terminal Tb1. The switch SWd1 is provided between the output terminal Tz1 and the first monitor terminal Tb1. The switch SWe1 is provided between the inspection voltage output line Lx and the first monitor terminal Tb1.

The second voltage output circuit 16_2 includes a switch SWa2, a switch SWb2, a switch SWc2, a switch SWd2, and a switch SWe2. The switch SWb2 is an example of a second inspection switch. The switch SWe2 is an example of a second monitor switch.

Similarly, the $j^{th}$ voltage output circuit 16_j includes a switch SWaj, a switch SWbj, a switch SWcj, a switch SWdj, and a switch SWej. The switch SWaj is provided between the output terminal Tyj and the $j^{th}$ output terminal Taj. The switch SWbj is provided between the inspection voltage output line Lx and the $j^{th}$ output terminal Taj. The switch SWcj is provided between the inspection voltage output line Lx and the $j^{th}$ monitor terminal Tbj. The switch SWdj is provided between the output terminal Tzj and the $j^{th}$ monitor terminal Tbj. The switch SWej is provided between the inspection voltage output line Lx and the $j^{th}$ monitor terminal Tbj.

The selection signals SELa1 to SELa7 are respectively supplied to the switches SWa1 to SWa7. That is, the selection signal SELaj is supplied to the switch SWaj. The switch SWaj is in an on state when the selection signal SELaj is at the first logic level, and is an off state when the selection signal SELaj is at the second logic level.

The selection signals SELb1 to SELb7 are respectively supplied to the switches SWb1 to SWb7. That is, the selection signal SELbj is supplied to the switch SWbj. The switch SWbj is in an on state when the selection signal SELbj is at the first logic level, and in an off state when the selection signal SELbj is at the second logic level.

The selection signals SELe1 to SELe7 are respectively supplied to the switches SWe1 to SWe7. That is, the selection signal SELej is supplied to the switch SWej. The switch SWej is in an on state when the selection signal SELej is at the first logic level, and in an off state when the selection signal SELej is at the second logic level.

1-3. Operations in First Inspection Mode

Figure 6:
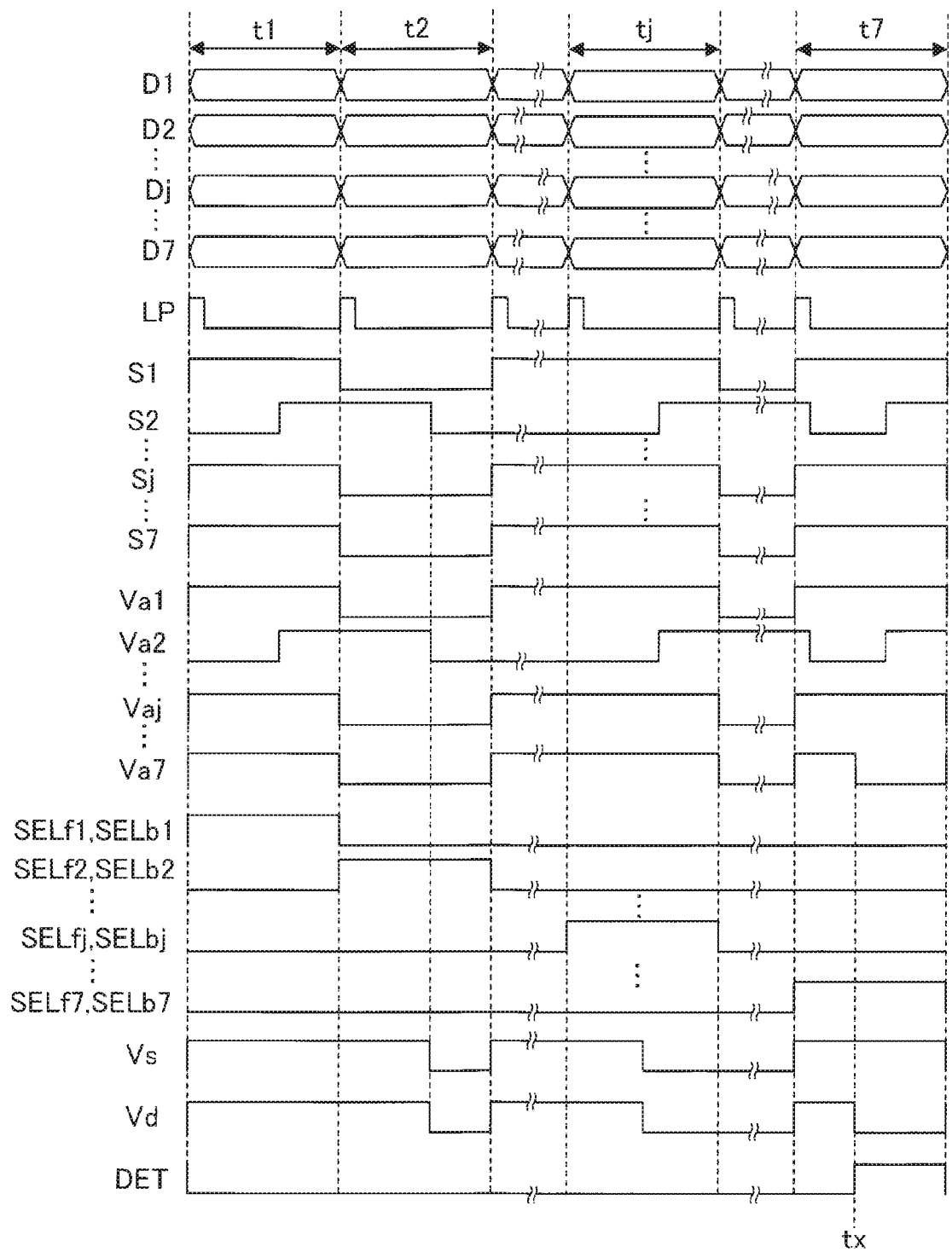
FIG. 6 is a timing chart illustrating the operations of the segment driver 100 in a first inspection mode.

The inspection according to the disclosure has several modes. First, the operations in a first inspection mode will be described. The inspection circuit 170 inspects whether a short circuit is present in a predetermined path in the first inspection mode. FIG. 6 is a timing chart illustrating the operations of the segment driver 100 in the first inspection mode. In the following description, the first logic level is a high level and the second logic level is a low level.

The segment driver 100 performs inspection in each of a first period t1, a second period t2, . . . , and a seventh period t7. Specifically, the segment driver 100 inspects, in the $j^{th}$ period tj, whether a short circuit is present in a path from the input terminal TXj of the $j^{th}$ voltage generation circuit 15_j to the $j^{th}$ segment electrode SEj, while displaying an image in the liquid crystal panel 10.

In the first inspection mode, the selection signals SELa1 to SELa7 all become a high level. Therefore, the switches SWa1 to SWa7 are all turned on. Meanwhile, in the first inspection mode, selection signals SELc1 to SELc7, selection signals SELd1 to SELd7, and the selection signals SELe1 to SELe7 all become a low level. Therefore, the switches SWc1 to SWc7, the switches SWd1 to SWd7, and the switches SWe1 to SWe7 are all turned off.

Moreover, in the $j^{th}$ period, the selection signal SELfj and the selection signal SELbj become a high level. Also, in a period other than the $j^{th}$ period, the selection signal SELfj and the selection signal SELbj are at a low level. As a result, the switch SWfj and the switch SWbj are in an on state in the $j^{th}$ period, and in an off state in periods other than the $j^{th}$ period.

As shown in FIG. 6, at the start of the $j^{th}$ period tj, the latch pulse LP rises from a low level to a high level. The latch circuit 120 outputs the data D1 to D7 by latching the data d1 to d7 output from the memory circuit 110 in synchronization with the rising edge of the latch pulse LP. With this latching operation, even if the input data Din is changed during any of the first to seventh periods t1 to t7, the values of the data D1 to D7 do not change in each period.

The signal selection circuit 130 selects one PWM signal from the PWM signals P1 to P8 based on the data Dj, and outputs the selected PWM signal as the $j^{th}$ signal Sj.

In the first period t1, the signal output circuit 140 operates as follows. In the first period t1, the selection signal SELf1 becomes a high level, and therefore, the switch SWf1 is turned on. Also, the selection signal SELf2 becomes a low level, and the switch SWf2 is turned off. As a result, the signal output circuit 140 outputs, in the first period t1, the voltage of the first signal S1 to the signal voltage output line Ly, and does not output the voltage of the second signal S2 to the signal voltage output line Ly. Also, because the selection signal SELf3 to SELf7 become a low level in the first period t1, the signal output circuit 140 does not output the voltages of the third to seventh signals S3 to S7 to the signal voltage output line Ly. Therefore, in the first period t1, the voltage of the first signal S1 is output, as the signal voltage Vs, from the signal voltage output line Ly to the inspection circuit 170.

In the second period t2, the signal output circuit 140 operates as follows. In the second period t2, the selection signal SELf2 becomes a high level, and therefore, the switch SWf2 is turned on. Also, the selection signal SELf1 becomes a low level, and the switch SWf1 is turned off. As a result, the signal output circuit 140 outputs, in the second period t2, the voltage of the second signal S2 to the signal voltage output line Ly, and does not output the voltage of the first signal S1 to the signal voltage output line Ly. Also, because the selection signals SELf3 to SELf7 become a low level in the second period t2, the signal output circuit 140 does not output the voltages of the third to seventh signals S3 to S7 to the signal voltage output line Ly. Therefore, in the second period t2, the voltage of the second signal S2 is output, as the signal voltage Vs, from the signal voltage output line Ly to the inspection circuit 170.

Similarly, in the seventh period t7, the signal output circuit 140 outputs, as the signal voltage Vs, the voltage of the seventh signal S7 to the inspection circuit 170 through the signal voltage output line Ly.

In the first period t1, the signal output circuit 160 operates as follows. In the first period t1, the selection signal SELb1 becomes a high level, and therefore, the switch SWb1 is turned on. Also, the selection signal SELb2 becomes a low level, and the switch SWb2 is turned off. As a result, the signal output circuit 160 outputs, in the first period t1, the voltage of the first output terminal Ta1 to the inspection voltage output line Lx, and does not output the voltage of the second output terminal Ta2 to the inspection voltage output line Lx. Also, because the selection signal SELb3 to SELb7 become a low level in the first period t1, the signal output circuit 160 does not output the voltages of the third to seventh output terminals Ta3 to Ta7 to the inspection voltage output line Lx. Therefore, in the first period t1, the voltage of the first output terminal Ta1 is output, as the inspection voltage Vd, from the inspection voltage output line Lx to the inspection circuit 170.

In the second period t2, the signal output circuit 160 operates as follows. In the second period t2, the selection signal SELb2 becomes a high level, and therefore, the switch SWb2 is turned on. Also, the selection signal SELb1 becomes a low level, and the switch SWb1 is turned off. As a result, the signal output circuit 160 outputs, in the second period t2, the voltage of the second output terminal Ta2 to the inspection voltage output line Lx, and does not output the voltage of the first output terminal Ta1 to the inspection voltage output line Lx. Also, because the selection signal SELb3 to SELb7 become a low level in the second period t2, the signal output circuit 160 does not output the voltages of the third to seventh output terminals Ta3 to Ta7 to the inspection voltage output line Lx. Therefore, in the second period t2, the voltage of the second output terminal Ta2 is output, as the inspection voltage Vd, from the inspection voltage output line Lx to the inspection circuit 170.

Similarly, in the seventh period t7, the voltage output circuit 160 outputs, as the inspection voltage Vd, the voltage of the seventh output terminal Ta7 to the inspection circuit 170 through the inspection voltage output line Lx.

The inspection circuit 170 inspects whether or not an anomaly is present in paths from the inputs of the first to seventh voltage generation circuits 15_1 to 15_7 to the first to seventh segment electrodes SE1 to SE7, respectively, based on the signal voltage Vs and the inspection voltage Vd. The relationship between the signal voltage Vs and the inspection voltage Vd when it is normal is determined in advance. The inspection circuit 170 inspects whether or not an anomaly is present in the paths described above by determining whether or not the signal voltage Vs and the inspection voltage Vd is in the relationship determined in advance.

More specifically, in the first period t1, the inspection circuit 170 inspects whether an anomaly is present in a first path based on the voltage of the first signal S1 and the voltage of the first output terminal Ta1. The first path is a path from the input terminal Tx1 of the first voltage generation circuit 15_1 to the first circuit X1 of the first voltage generation circuit 15_1, the switch SWa1, the first output terminal Ta1, the first output line La1, and the first segment electrode SE1. In the second period t2, the inspection circuit 170 inspects whether an anomaly is present in a second path based on the voltage of the second signal S2 and the second voltage Va2. The second path is a path from the input terminal Tx2 of the second voltage generation circuit 15_2 to the second circuit X2 of the second voltage generation circuit 15_2, the switch SWa2, the second output terminal Ta2, the second output line La2, and the second segment electrode SE2. Similarly, in the seventh period t7, the inspection circuit 170 inspects whether an anomaly is present in a seventh path based on the voltage of the seventh signal S7 and the voltage of the seventh output terminal Ta7. The seventh path is a path from the input terminal Tx7 of the seventh voltage generation circuit 15_7 to the first circuit X1 of the seventh voltage generation circuit 15_7, switch SWa7, the seventh output terminal Ta7, the seventh output line La7, and the seventh segment electrode SE7.

In the example shown in FIG. 6, the logic level of the signal voltage Vs matches the logic level of the inspection voltage Vd in the first period t1 and the second period t2. Accordingly, the inspection circuit 170 outputs the inspection signal DET at a low level in the first period t1 and the second period t2. That is, the inspection circuit 170 judges that the first path and the second path are normal.

In this example, at time tx in the seventh period t7, the seventh voltage Va7 transitions from a high level to a low level. On the other hand, in the seventh period t7, the seventh signal S7 is kept at a high level. For example, if the seventh output line La7 is short-circuited to ground, or the first circuit X1 of the seventh voltage generation circuit 15_7 fails, at time tx, the voltage of the seventh output terminal Ta7 changes from a high level to a low level.

After time tx in the seventh period t7, the logic level of the signal voltage Vs does not match the logic level of the inspection voltage Vd. Therefore, the inspection circuit 170 causes the logic level of the inspection signal DET to transition from a low level to a high level, at time tx in the seventh period t7. That is, the inspection circuit 170 judges that the seventh path is anomalous.

As described above, in the first inspection mode, the segment driver 100 can inspect whether a short circuit anomaly is present in the first to seventh paths while displaying an image in the liquid crystal panel 10. Accordingly, the reliability of the display module 1 improves. Moreover, since the segment driver 100 inspects the short circuit anomaly in the first to seventh paths in a time division manner, the configuration can be simplified compared with a case where seven inspection circuits are provided so as to be in one-to-one correspondence with the first to seventh paths.

1-4. Operations in Second Inspection Mode

Figure 7:
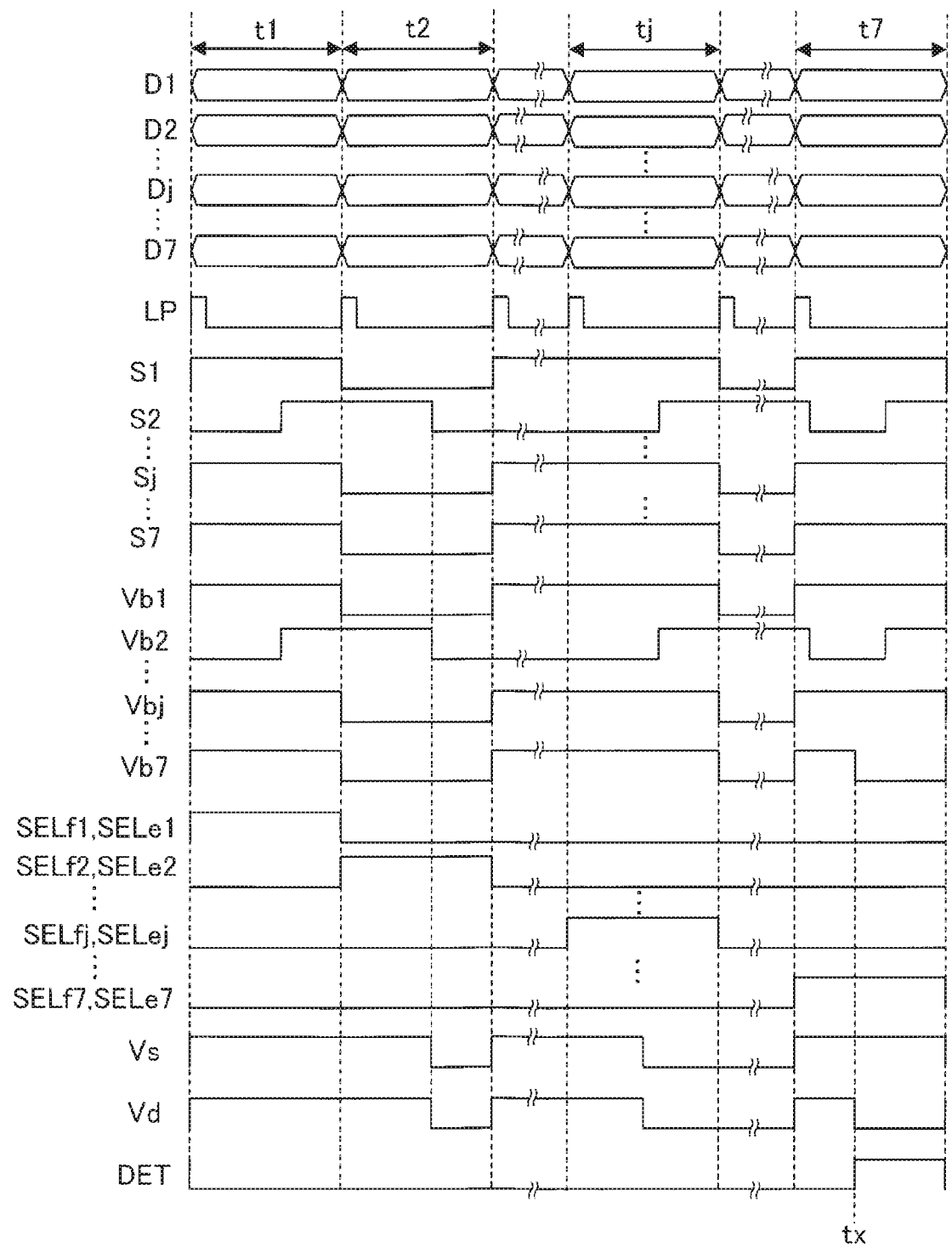
FIG. 7 is a timing chart illustrating the operations of the segment driver 100 in a second inspection mode.

Next, the operations in a second inspection mode will be described. In the first inspection mode described above, whether a short circuit is present in the first to seventh paths is inspected. However, it cannot be inspected whether a disconnection is present in any of the first to seventh output lines La1 to La7. It is because, even if a disconnection is present, the signal voltage Vs and the inspection voltage Vd are not affected. In the second inspection mode, whether a disconnection is present in any of the first to seventh output lines La1 to La7 is inspected. FIG. 7 is a timing chart illustrating the operations of the segment driver 100 in the second inspection mode.

The segment driver 100 executes inspection of disconnection in each of the first period t1, the second period t2, . . . , and the seventh period t7. Specifically, the segment driver 100 inspects whether a disconnection is present in the $j^{th}$ output line Laj in the $j^{th}$ period tj while displaying an image in the liquid crystal panel 10.

In the second inspection mode, the selection signals SELa1 to SELa7 all become a high level. Therefore, the switches SWa1 to SWa7 are all turned on. Meanwhile, in the second inspection mode, the selection signals SELb1 to SELb7, the selection signals SELc1 to SELc7, and the selection signals SELd1 to SELd7 all become a low level. Therefore, the switches SWb1 to SWb7, the switches SWc1 to SWc7, and the switches SWd1 to SWd7 are all turned off.

Moreover, in the $j^{th}$ period, the selection signal SELfj and the selection signal SELej become a high level. Also, in periods other than the $j^{th}$ period, the selection signal SELfj and the selection signal SELej become a low level. As a result, the switch SWfj and the switch SWej are turned on in the $j^{th}$ period, and are turned off in periods other than the $j^{th}$ period.

In the second inspection mode, the memory circuit 110, the latch circuit 120, and the signal output circuit 140 operate similarly to the first inspection mode. On the other hand, in the second inspection mode, the voltage output circuit 160 operates differently from the first inspection mode.

In the first period t1, the signal output circuit 160 operates as follows. In the first period t1, the selection signal SELe1 becomes a high level, and therefore, the switch SWe1 is turned on. Also, the selection signal SELe2 becomes a low level, and the switch SWe2 is turned off. As a result, the signal output circuit 160 outputs, in the first period t1, the voltage of the first monitor terminal Tb1 to the inspection voltage output line Lx, and does not output the voltage of the second monitor terminal Tb2 to the inspection voltage output line Lx. Also, because the selection signals SELe3 to SELe7 become a low level in the first period t1, the signal output circuit 160 does not output the voltages of the third to seventh monitor terminals Tb3 to Tb7 to the inspection voltage output line Lx. Therefore, in the first period t1, the voltage of the first monitor terminal Tb1 is output, as the inspection voltage Vd, from the inspection voltage output line Lx to the inspection circuit 170. The switch SWe1 is an example of a first monitor switch, and the switch SWe2 is an example of a second monitor switch. The first period t1 in the second inspection mode is an example of a third period that is different from the first period t1 and the second period t2 in the first inspection mode.

In the second period t2, the signal output circuit 160 operates as follows. In the second period t2, the selection signal SELe2 becomes a high level, and therefore, the switch SWe2 is turned on. Also, the selection signal SELe1 becomes a low level, and the switch SWe1 is turned off. As a result, the signal output circuit 160 outputs, in the second period t2, the voltage of the second monitor terminal Tb2 to the inspection voltage output line Lx, and does not output the voltage of the first monitor terminal Tb1 to the inspection voltage output line Lx. Also, because the selection signals SELe3 to SELe7 become a low level in the second period t2, the signal output circuit 160 does not output the voltages of the third to seventh monitor terminals Tb3 to Tb7 to the inspection voltage output line Lx. Therefore, in the second period t2, the voltage of the second monitor terminal Tb2 is output, as the inspection voltage Vd, from the inspection voltage output line Lx to the inspection circuit 170. The second period t2 in the second inspection mode is an example of a fourth period that is different from the first period t1 and the second period t2 in the first inspection mode and the first period t1 in the second inspection mode.

The inspection circuit 170 inspects whether or not an anomaly is present in the first to seventh paths based on the signal voltage Vs and the inspection voltage Vd, and outputs the inspection signal DET indicating the inspection result.

As described above, in the second inspection mode, the segment driver 100 can inspect whether a disconnection anomaly is present in the first to seventh paths while displaying an image in the liquid crystal panel 10. Therefore, the reliability of the display module 1 improves. Moreover, since the segment driver 100 inspects the disconnection anomaly in the first to seventh paths in a time division manner, one inspection circuit can be used in common as the inspection circuits of the respective paths. Therefore, the configuration can be simplified compared with a case where seven inspection circuits are provided so as to be in one-to-one correspondence with the first to seventh paths.

1-5. Third Inspection Mode

In the third inspection mode, an anomaly that cannot be detected in the first inspection mode is detected.

Figure 8:
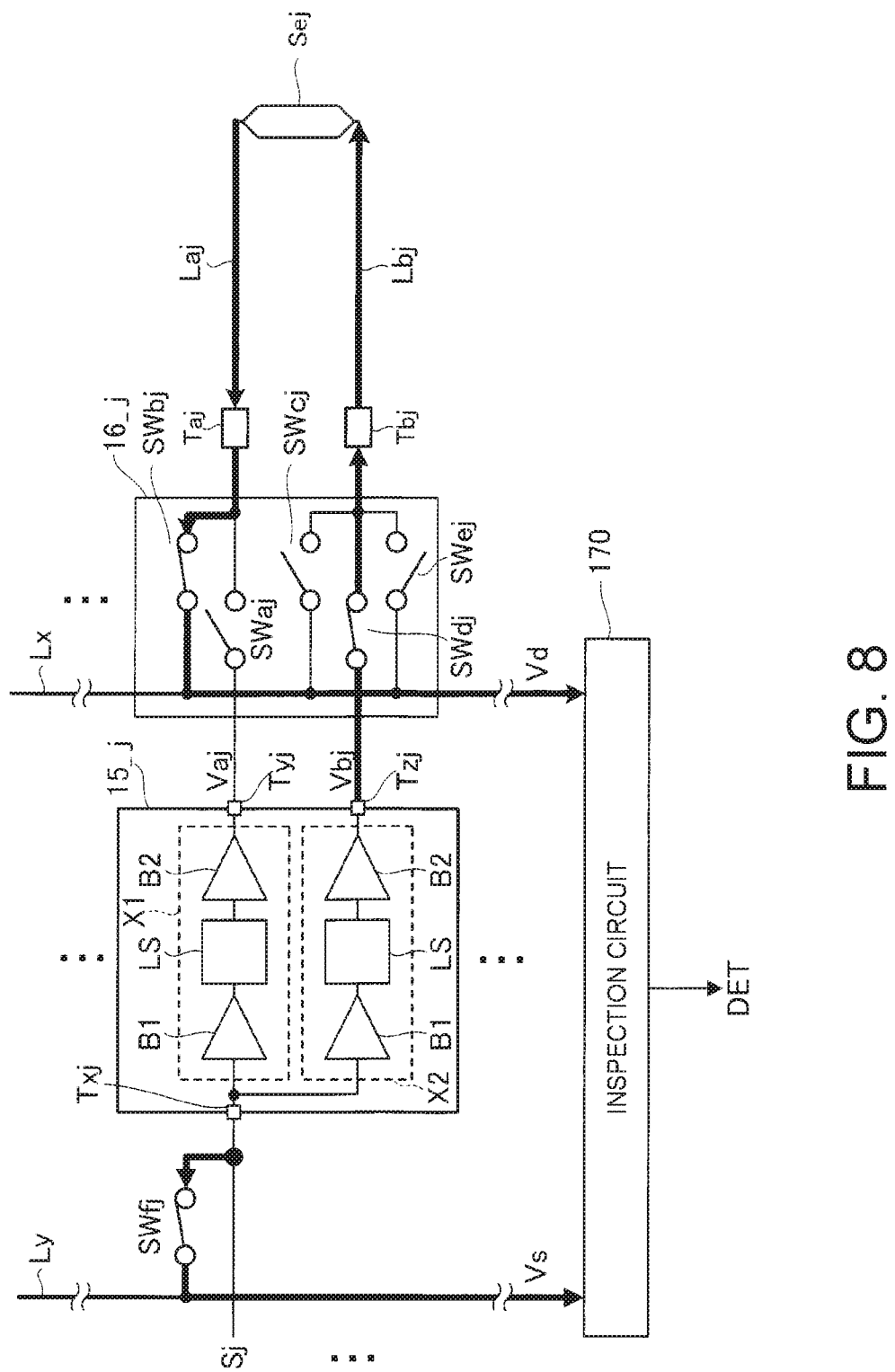
FIG. 8 is a diagram illustrating the states of switches in a third inspection mode.

In the third inspection mode, the control circuit 300 turns the logic levels of the selection signals SELaj, SELcj, and SELej to a low level, and turns the logic levels of the selection signals SELbj and SELdj to a high level. FIG. 8 is a diagram illustrating the states of switches in the third inspection mode. As shown in FIG. 8, the switches SWb1 and SWdj are turned on, and the switches SWaj, SWcj, and SWej are turned off. As a result, the voltage of the $j^{th}$ output terminal Taj is output, as the inspection voltage Vd, to the inspection circuit 170 from the inspection voltage output line Lx. Also, the voltage of the $j^{th}$ signal Sj is output, as the signal voltage Vs, to the inspection circuit 170 from the signal voltage output line Ly.

If the inspection result of the inspection circuit 170 indicates normal, the cause of an anomaly having been found in the $j^{th}$ path in the first inspection mode is specified as the failure of the first circuit X1 of the $j^{th}$ voltage generation circuit 15_j. In this case, if the $j^{th}$ voltage Vbj is generated using the second circuit X2, the display failure can be resolved. Therefore, the control circuit 300 sets the logic level of the selection signal SELaj to a low level, and the logic level of the selection signal SELdj to a high level. With this control, the $j^{th}$ voltage Vbj is applied to the $j^{th}$ segment electrode through the $j^{th}$ monitor line Lbj.

When the inspection result in the third inspection mode indicates an anomaly, it is possible that a short circuit or a disconnection occurs in the $j^{th}$ output line Laj. Therefore, in this case, whether a short circuit or a disconnection occurs in the $j^{th}$ output line Laj is determined in a fourth inspection mode.

1-6. Fourth Inspection Mode

Figure 9:
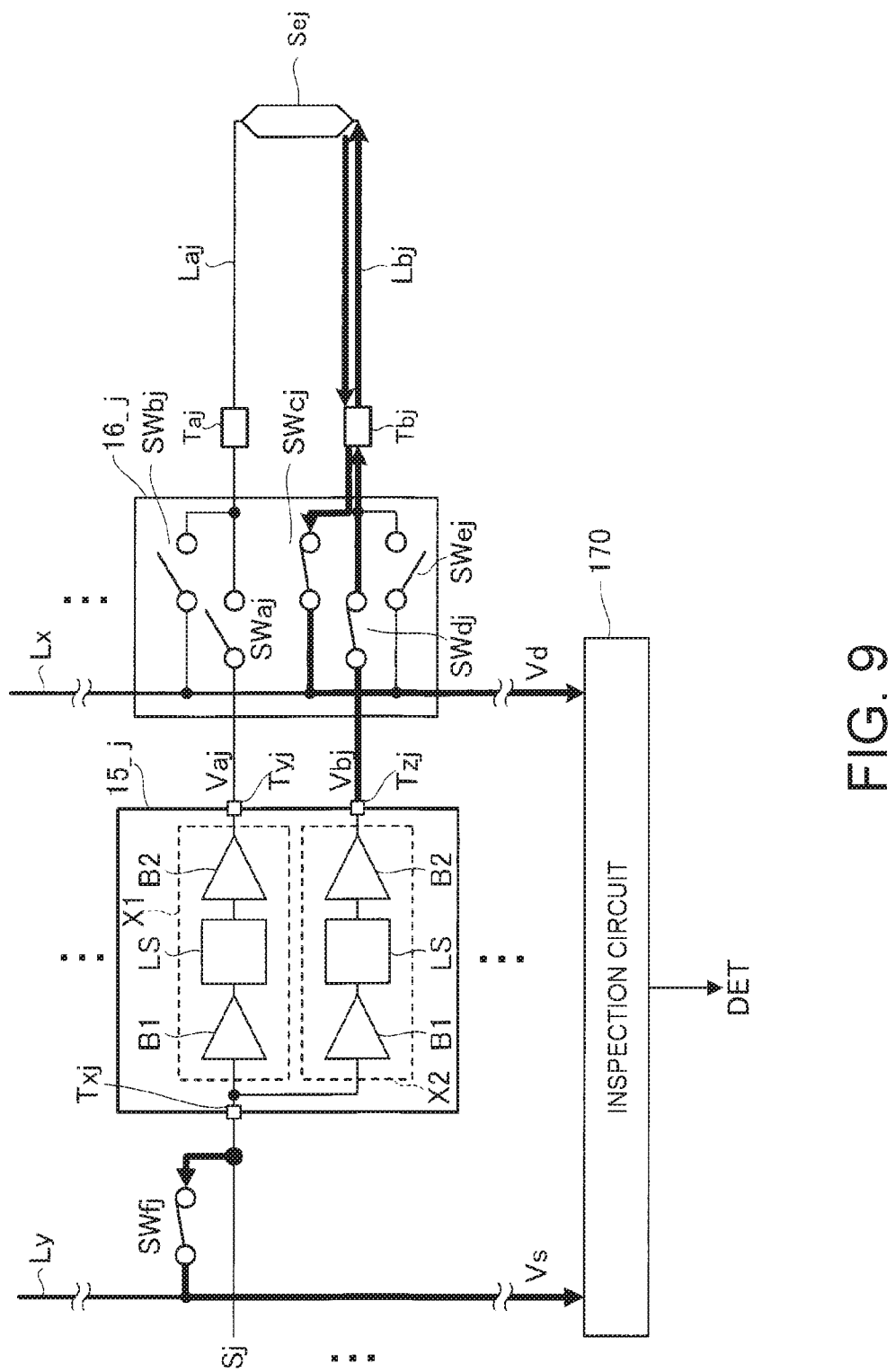
FIG. 9 is a diagram illustrating the states of the switches in the fourth inspection mode.

In the fourth inspection mode, an anomaly that cannot be detected in the third inspection mode is detected. The control circuit 300 turns the logic levels of the selection signals SELaj, SELbj, and SELej to a low level, and turns the logic levels of the selection signals SELcj and SELdj to a high level. FIG. 9 is a diagram illustrating the states of the switches in the fourth inspection mode. As shown in FIG. 9, the switches SWc1 and SWdj are turned on, and the switches SWaj, SWbj, and SWej are turned off. As a result, the voltage of the $j^{th}$ monitor terminal Tbj is output, as the inspection voltage Vd, to the inspection circuit 170 from the inspection voltage output line Lx. Also, the voltage of the $j^{th}$ signal Sj is output, as the signal voltage Vs, to the inspection circuit 170 from the signal voltage output line Ly.

If the inspection result of the inspection circuit 170 indicates normal, the cause of an anomaly having been found in the $j^{th}$ path in the first and third inspection modes is specified as a short circuit or a disconnection of the $j^{th}$ output line Laj. In this case, the control circuit 300 sets the logic level of the selection signal SELaj to a low level, and sets the logic level of the selection signal SELdj to a high level. With this control, the $j^{th}$ voltage Vbj is applied to the $j^{th}$ segment electrode through the $j^{th}$ monitor line Lbj.

On the other hand, if the inspection result of the inspection circuit 170 indicates an anomaly, the cause is a failure of the second circuit X2 or a short circuit of the $j^{th}$ monitor line Lbj. In this case, the control circuit 300 notifies the host processor 2 that the display module 1 is failed, via the interface 400, for example.

As described above, the voltage output circuit 160 is arranged between the first voltage generation circuit 15_1 and the first output terminal Ta1, and between the second voltage generation circuit 15_2 and the second output terminal Ta2. The voltage output circuit 160 includes the inspection voltage output line Lx through which the first inspection voltage and the second inspection voltage are output. The first inspection voltage is the inspection voltage Vd for inspecting the application state of the first voltage Va1 to the first segment electrode SE1. The second inspection voltage is the inspection voltage Vd for inspecting the application state of the second voltage Va2 to the second segment electrode SE2. In the first period t1, the voltage output circuit 160 outputs the first inspection voltage to the inspection voltage output line Lx, and does not output the second inspection voltage to the inspection voltage output line Lx. In the second period t2 that is different from the first period t1, the voltage output circuit 160 outputs the second inspection voltage to the inspection voltage output line Lx, and does not output the first inspection voltage to the inspection voltage output line Lx. Also, the signal output circuit 140 includes the signal voltage output line Ly through which the voltage of the first signal S1 or the voltage of the second signal S2 is output. In the first period t1, the signal output circuit 140 outputs the voltage of the first signal S1 to the signal voltage output line Ly, and does not output the voltage of the second signal S2 to the signal voltage output line Ly. In the second period t2, the signal output circuit 140 outputs the voltage of the second signal S2 to the signal voltage output line Ly, and does not output the voltage of the first signal S1 to the signal voltage output line Ly. The inspection circuit 170 inspects, in the first period t1, whether or not an anomaly is present in a path from the input of the first voltage generation circuit 15_1 to the first segment electrode SE1, and inspects, in the second period t2, whether or not an anomaly is present in a path from the input of the second voltage generation circuit 15_2 to the second segment electrode SE2, based on the first inspection voltage or the second inspection voltage that is output from the inspection voltage output line Lx, and the voltage of the first signal S1 or the voltage of the second signal S2 that is output from the signal voltage output line Ly.

Accordingly, the driving circuit 20 including the segment driver 100 executes inspection, in the first period t1, with respect to a path reaching to the first segment electrode SE1, and can execute inspection, in the second period t2, with respect to a path reaching to the second segment electrode SE2. In this way, since the driving circuit 20 can perform inspection in a time division manner, one inspection circuit can be used in common as the inspection circuits of the respective paths. Therefore, the configuration can be simplified compared with a case where the inspection circuit corresponding to the first segment electrode SE1 and the inspection circuit corresponding to the second segment electrode SE2 are provided. Also, the driving circuit 20 can execute inspection in a state in which the first voltage Va1 is applied to the first segment electrode SE1 and the second voltage Va2 is applied to the second segment electrode SE2. That is, the driving circuit 20 can execute inspection while displaying an image in the liquid crystal panel 10, which is an example of the display panel. Therefore, an anomaly can be detected during the display module 1 is in operation, and as a result, the reliability of the display module 1 is improved.

The voltage output circuit 160 includes the switch SWb1, which is an example of the first inspection switch and the switch SWb2, which is an example of the second inspection switch. The switch SWb1 is provided between the inspection voltage output line Lx and the first output terminal Ta1. The switch SWb2 is provided between the inspection voltage output line Lx and the second output terminal Ta2. In the first period t1, the switch SWb1 is turned on, and the switch SWb2 is turned off. In the second period t2, the switch SWb2 is turned on, and the switch SWb1 is turned off.

Therefore, the switch SWb1 and the switch SWb2 are turned on in different periods, and therefore the driving circuit 20 can output the voltage of the first output terminal Ta1 and the voltage of the second output terminal Ta2 to the inspection voltage output line LX in a time division manner. As a result, the configuration can be simplified compared with a case where the interconnect for outputting the inspection voltage Vd to the inspection circuit is provided separately for each of the switch SWb1 and the switch SWb2.

The signal output circuit 140 includes the switch SWf1, which is an example of the first signal switch, and the switch SWf2, which is an example of the second signal switch. The switch SWf1 is provided between the signal voltage output line Ly and the input terminal Tx1 of the first voltage generation circuit 15_1. The switch SWf2 is provided between the signal voltage output line Ly and the input terminal Tx2 of the second voltage generation circuit 15_2. In the first period t1, the switch SWf1 is turned on, and the switch SWf2 is turned off. In the second period t2, the switch SWf2 is turned on, and the switch SWf1 is turned off.

Accordingly, the switch SWf1 and the switch SWf2 are turned on in different periods, and therefore the driving circuit 20 can output the voltage of the first signal S1 and the voltage of the second signal S2 to the signal voltage output line Ly in a time division manner. The signal voltage output line Ly is a common signal output line of the first signal S1 and the second signal S2. As a result, the configuration can be simplified compared with a case where the interconnect for outputting the signal voltage Vs to the inspection circuit 170 is provided separately for each of the switch SWf1 and the switch SWf2.

The driving circuit 20 includes the first monitor terminal Tb1 that is to be connected to the first segment electrode SE1 through the first monitor line Lb1 for monitoring the first voltage, and the second monitor terminal Tb2 to be connected to the second segment electrode SE2 through the second monitor line Lb2 for monitoring the second voltage. The first output terminal Ta1 and the first segment electrode SE1 are connected through the first output line La1. The second output terminal Ta2 and the second segment electrode SE2 are connected through the second output line La2. The voltage output circuit 160 includes the switch SWe1, which is an example of the first monitor switch, and the switch SWe2, which is an example of the second monitor switch. The switch SWe1 is provided between the inspection voltage output line Lx and the first monitor terminal Tb1. The switch SWe2 is provided between the inspection voltage output line Lx and the second monitor terminal Tb2. In the first period t1 in the first inspection mode, the switch SWe1 and the switch SWe2 are turned off. In the second period t2 in the first inspection mode, the switch SWe1 and the switch SWe2 are turned off. The first period t1 in the second inspection mode is an example of the third period that is different from the first period t1 in the first inspection mode and the second period t2 in the first inspection mode. In the first period t1 in the second inspection mode, the switch SWe1 is turned on, and the switch SWb1, the switch SWb2, and the switch SWe2 are turned off. The second period t2 in the second inspection mode is an example of the fourth period that is different from the first period t1 in the first inspection mode, the second period t2 in the first inspection mode, and the first period t1 in the second inspection mode.

In the second period t2 in the second inspection mode, the switch SWe2 is turned on, and the switch SWb1, the switch SWb2, and the switch SWe1 are turned off.

According to the configuration described above, the inspection circuit 170 can inspect, in the first period t1 in the second inspection mode, an anomaly in the path from the first monitor terminal Tb1 to the first monitor line Lb1, the first segment electrode SE1, and the first output terminal Ta1. Also, the inspection circuit 170 can inspect, in the second period t2 in the second inspection mode, an anomaly in the path from the second monitor terminal Tb2 to the second monitor line Lb2, the second segment electrode SE2, and the second output terminal Ta2. Accordingly, the driving circuit 20 can execute, in the second inspection mode, inspection with respect to different paths in a time division manner, and therefore one inspection circuit can be used in common as the inspection circuits of the respective paths. Therefore, the configuration can be simplified compared with a case where the inspection circuit corresponding to the first segment electrode SE1 and the inspection circuit corresponding to the second segment electrode SE2 are provided. Also, the driving circuit 20 can inspect a disconnection of the first output line La1 and the second output line La2 in a state in which the first voltage Va1 is applied to the first segment electrode SE1 and the second voltage Va2 is applied to the second segment electrode SE2. That is, the inspection circuit 170 can execute inspection of the disconnection while displaying an image in the liquid crystal panel 10. Therefore, an anomaly can be detected during the display module 1 is in operation, and as a result, the reliability of the display module 1 is improved.

In the first period t1 in the second inspection mode, the switch SWf1 is turned on, and the switch SWf2 is turned off. In the second period t2 in the second inspection mode, the switch SWf2 is turned on, and the switch SWf1 is turned off.

Accordingly, the switch SWf1 and the switch SWf2 are turned on in different periods, and therefore the driving circuit 20 can output the voltage of the first signal S1 and the voltage of the second signal S2 to the signal voltage output line Ly in a time division manner. As a result, the configuration can be simplified compared with a case where the interconnect for outputting the signal voltage Vs to the inspection circuit 170 is provided separately for each of the switch SWf1 and the switch SWf2.

The driving circuit 20 includes the signal selection circuit 130, and the signal selection circuit 130 includes the first selection circuit 13_1 and the second selection circuit 13_2. The first selection circuit 13_1 selects one PWM signal from the plurality of PWM signals P1 to P8 based on the data D1 indicating the tone to be displayed in a region corresponding to the first segment electrode SE1, and outputs the selected one PWM signal as the first signal S1. The second selection circuit 13_2 selects one PWM signal from the plurality of PWM signals P1 to P8 based on the data D2 indicating the tone to be displayed in a region corresponding to the second segment electrode SE2, and outputs the selected one PWM signal as the second signal S2. According to the configuration described above, the tones that are to be displayed in the respective segments can be controlled using the PWM signals.

The display module 1 includes the driving circuit 20 and the liquid crystal panel 10, which is an example of the display panel. The driving circuit 20 can detect an anomaly while displaying an image, and therefore the reliability of the display module 1 can be improved.

2. Other Embodiments

The present disclosure is not limited to the two embodiments described above. The present disclosure encompasses the following modifications and appropriate combinations of the embodiments and the modifications.

Figure 10:
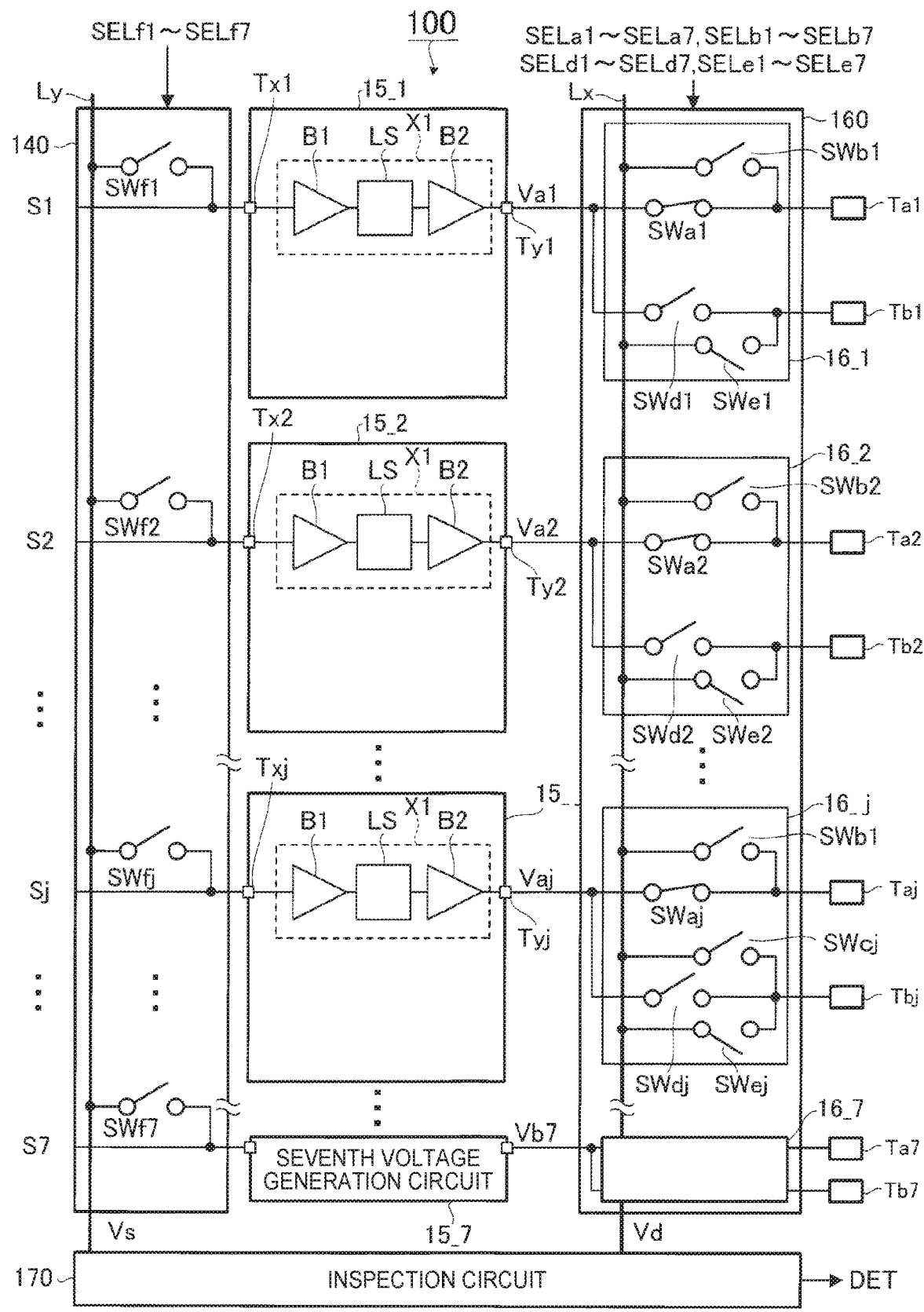
FIG. 10 is a block diagram of a signal selection circuit 130, s signal output circuit 140, first to seventh voltage generation circuits 15_1 to 15_7, a voltage output circuit 160, and an inspection circuit 170 according to a modification of the embodiments.

(1) In the embodiments, the first to seventh voltage generation circuits 15_1 to 15_7 each include the first circuit X1 and the second circuit X2, but the second circuit X2 may be omitted. FIG. 10 is a block diagram of a signal selection circuit 130, a signal output circuit 140, first to seventh voltage generation circuits 15_1 to 15_7, a voltage output circuit 160, and an inspection circuit 170 according to a modification of the embodiments.

Figure 11:
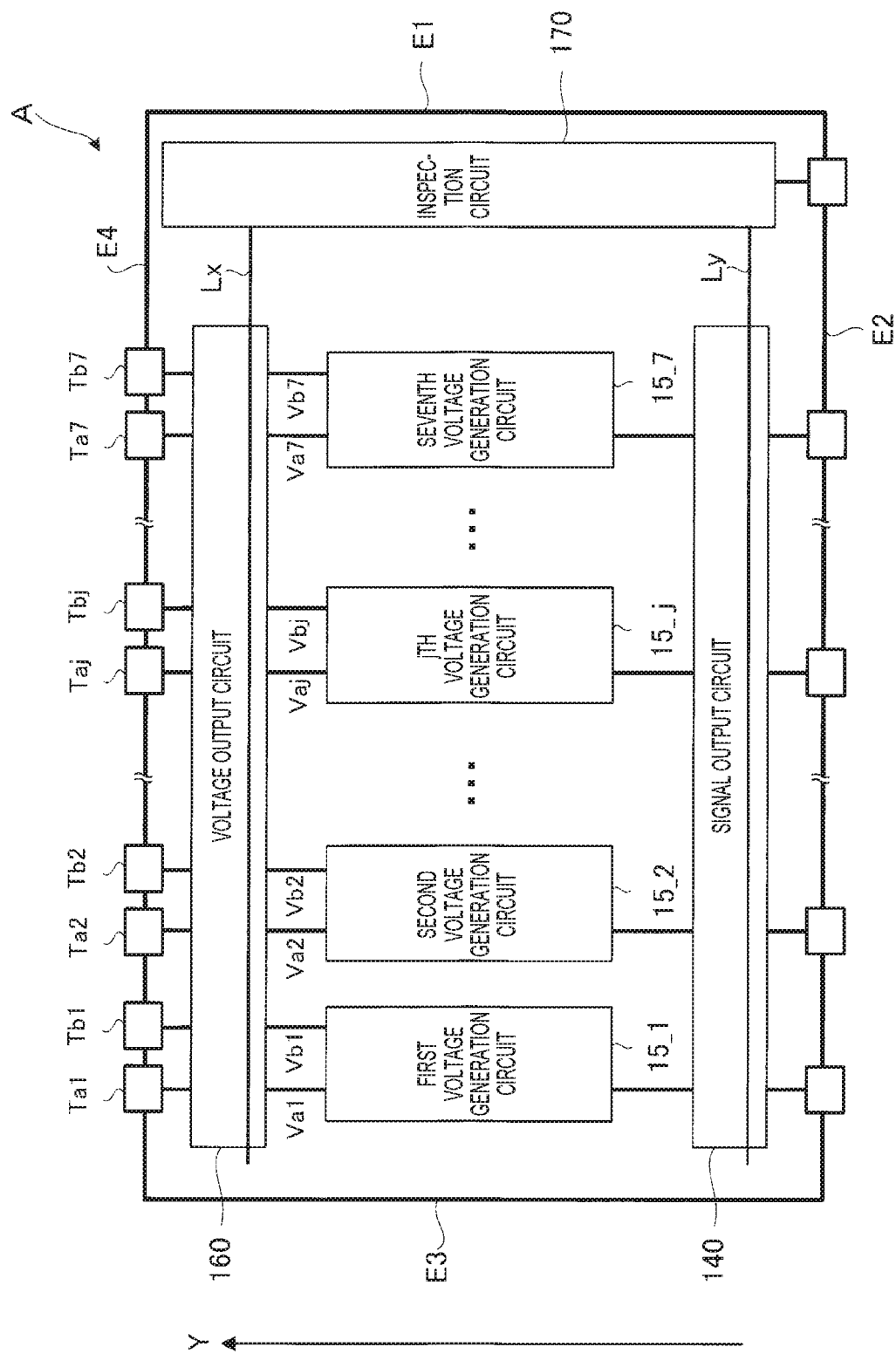
FIG. 11 is a diagram illustrating the layout, in an IC chip A, of constituent elements in the segment driver 100 according to the modification of the embodiments.

(2) The segment driver 100 of the embodiments includes the memory circuit 110 and the latch circuit 120, but the segment driver 100 may not include these constituent elements. Also, the segment driver 100 may be constituted by an integrated circuit. FIG. 11 is a diagram schematically illustrating the layout, in an IC chip A, of the constituent elements in the segment driver 100 according to the modification of the embodiments. As shown in FIG. 11, the IC chip A has a rectangular shape in a plan view. In the IC chip A, the inspection voltage output line Lx and the signal voltage output line Ly are arranged along a long side E2 and a long side E4. Also, the inspection circuit 170 is arranged between the inspection voltage output line Lx and one short side E1 of the IC chip A, and between the signal voltage output line Ly and the one short side E1. Moreover, the first to seventh output terminals Ta1 to Ta7 and the first to seventh monitor terminals Tb1 to Tb7 are arranged on the long side E4.

According to the configuration described above, the first to seventh voltage generation circuits 15_1 to 15_7 can be arranged along the long side E2 and the long side E4, and the inspection circuit 170 can be arranged in the vicinity of the short side E1, and therefore the layout efficiency can be improved.

The signal output circuit 140 supplies the first to seventh signals S1 to S7 to the first to seventh voltage generation circuits 15_1 to 15_7 respectively. Therefore, it is preferable that the signal output circuit 140 is located on an input side of the first to seventh voltage generation circuits 15_1 to 15_7. Meanwhile, the voltage output circuit 160 supplies the first to seventh voltages Va1 to Va7 and Vb1 to Vb7 to the first to seventh output terminals Ta1 to Ta7 and the first to seventh monitor terminals Tb1 to Tb7, respectively. Therefore, it is preferable that the voltage output circuit 160 is located on an output side of the first to seventh voltage generation circuits 15_1 to 15_7.

In the layout shown in FIG. 11, the first to seventh voltage generation circuits 15_1 to 15_7 are arranged between the signal output circuit 140 and the voltage output circuit 160 in a first direction Y directed from the one long side E2 of the IC chip A toward the other long side E4. As a result of this layout, the signals can propagate in the first direction Y. As a result, the layout efficiency in the IC chip A can be improved.

Figure 12:
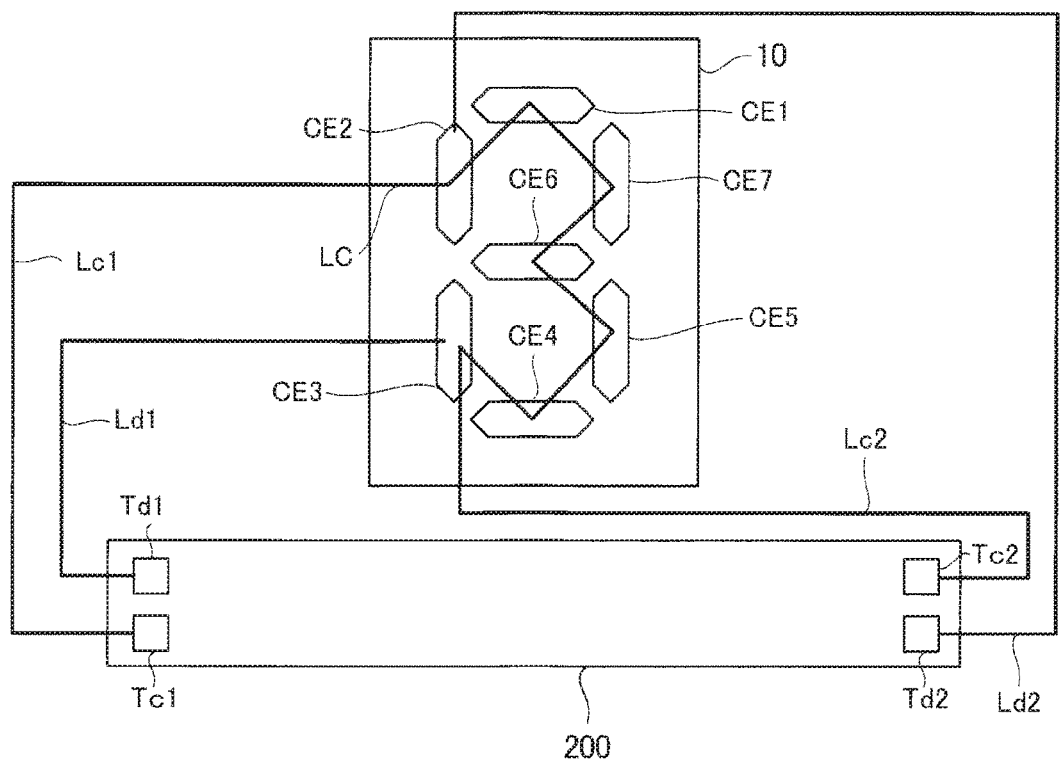
FIG. 12 is a diagram illustrating the connection relationship between a plurality of common electrodes and a common driver 200 according to the modification of the embodiments.

(3) The common driver 200 of the embodiments includes the first output terminal Tc1 and the first monitor terminal Td1, but the present disclosure is not limited thereto. FIG. 12 is a diagram illustrating the connection relationship between the plurality of common electrodes and the common driver 200 according to a modification of the embodiments. As shown in FIG. 12, one end of the common interconnect LC is connected to a first output terminal Tc1 through a first output line Lc1. The other end of the common interconnect LC is connected to a second output terminal Tc2 through a second output line Lc2. That is, in this example, the common voltage is applied to both ends of the common interconnect LC. A first monitor terminal Td1 is connected to the third common electrode CE3 through a first monitor line Ld1. A second monitor terminal Td2 is connected to the second common electrode CE2 through a second monitor line Ld2.

Figure 13:
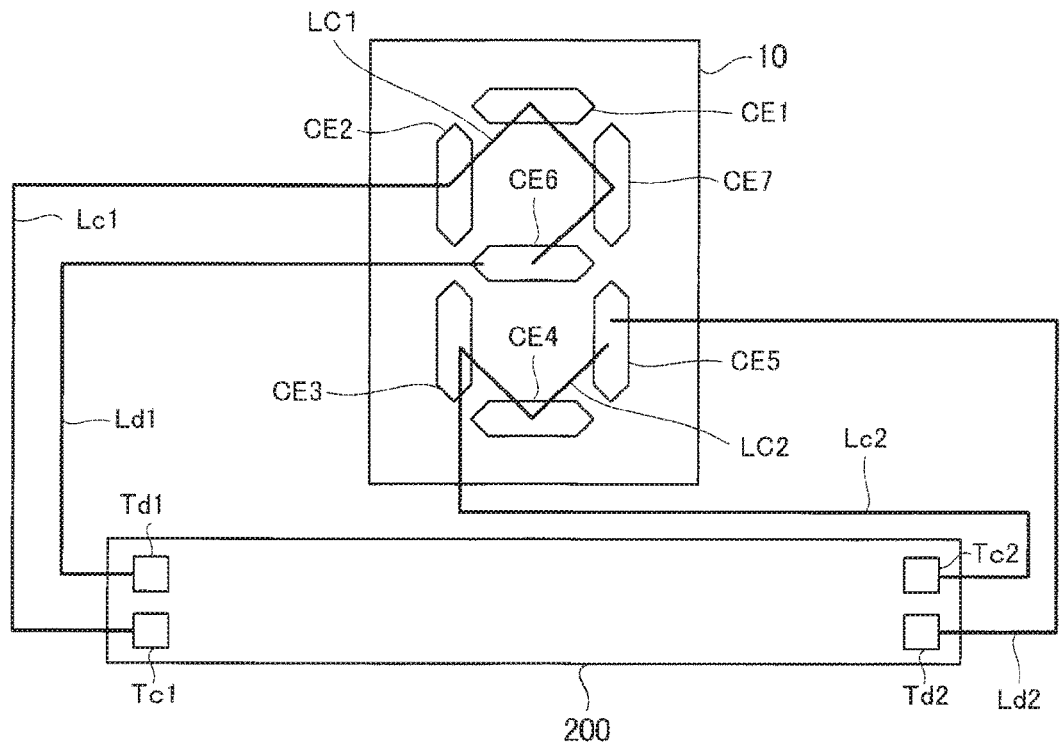
FIG. 13 is a diagram illustrating connection relationship between a plurality of common electrodes and a common driver 200 according to another modification of the embodiments.

FIG. 13 is a diagram illustrating connection relationship between the plurality of common electrodes and the common driver 200 according to another modification of the embodiments. As shown in FIG. 13, one end of a common interconnect LC1 is connected to a first output terminal Tc1 through a first output line Lc1. The other end of a common interconnect LC2 is connected to a second output terminal Tc2 through a second output line Lc2. Also, a first monitor terminal Td1 is connected to the sixth common electrode CE6 through a first monitor line Ld1. A second monitor terminal Td2 is connected to the fifth common electrode CE5 through a second monitor line Ld2. That is, the first common electrode CE1, the second common electrode CE2, the sixth common electrode CE6, and the seventh common electrode CE7 are driven in a route different from the route in which the third common electrode CE3, the fourth common electrode CE4, and the fifth common electrode CE5 are driven. When the plurality of common electrodes are divided and driven, the inspection may be executed in a time division manner, as describe regarding the segment driver 100 of the embodiments described above.

(4) In the embodiments, the liquid crystal panel 10 and the driving circuit 20 are separated, but some of or all of the constituent elements such as the segment driver 100 and the common driver 200 that constitute the driving circuit 20 may be provided in the liquid crystal panel 10.

(5) In the embodiment described above, the liquid crystal panel 10 is illustrated as an example of the display panel, but the present disclosure is not limited thereto. The present disclosure may also be applied to an electro-optical panel, other than the liquid crystal panel, such as a display panel constituted by an electrophoretic element.

(6) In the embodiment described above, the first to seventh monitor terminals Tb1 to Tb7 that are in one-to-one correspondence with the first to seventh output terminals Ta1 to Ta7 are provided, but the present disclosure is not limited thereto. A configuration may also be adopted in which some of the first to seventh monitor terminals Tb1 to Tb7 are provided.

Figure 14:
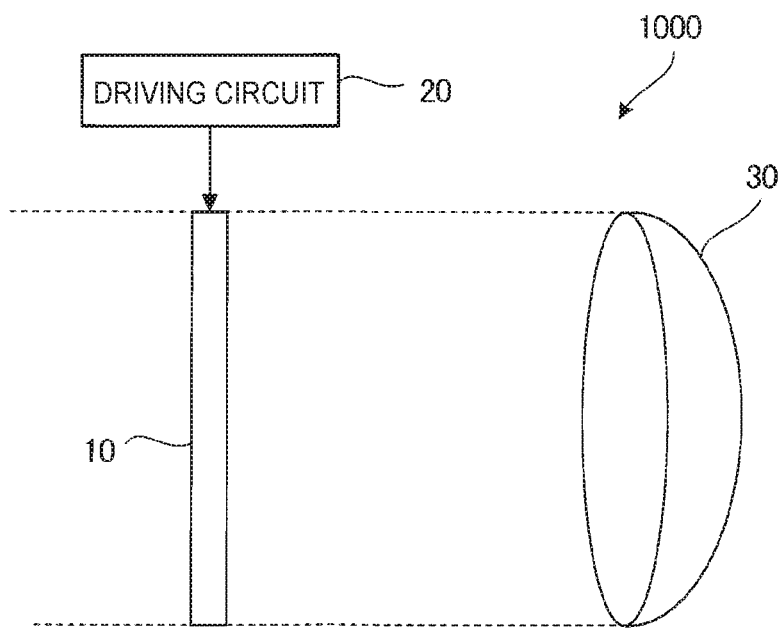
FIG. 14 is a block diagram illustrating an exemplary configuration of a headlight 1000 including the display module 1.
Figure 15:
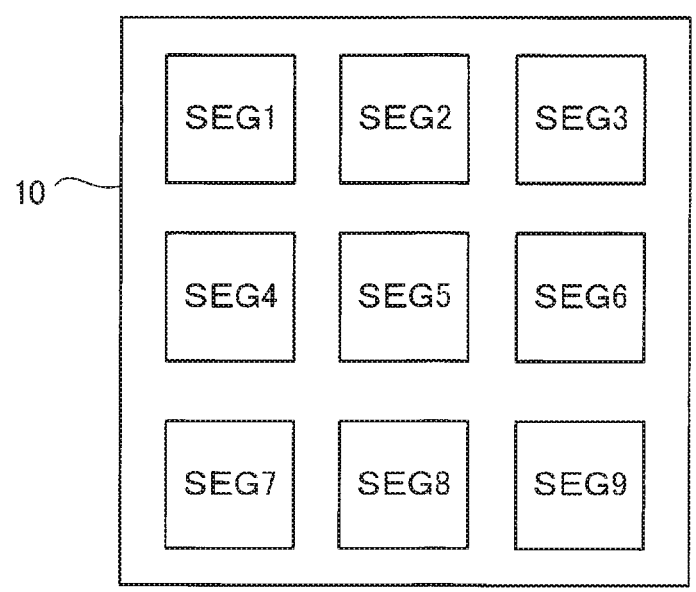
FIG. 15 is a diagram illustrating the arrangement of segments of a liquid crystal panel 10 to be applied to a headlight.

3. Application Examples (1) In the embodiment and the other embodiment, the display module 1 that displays an image has been described, but the present disclosure is not limited thereto. For example, the display module 1 may also be a liquid crystal shutter that controls transmission and blocking of light. A headlight is an example of the device to which the liquid crystal shutter can be applied. FIG. 14 is a block diagram illustrating an exemplary configuration of a headlight 1000 including the display module 1. FIG. 15 is a diagram illustrating the arrangement of segments of a liquid crystal panel 10 to be applied to a headlight.

The headlight 1000 includes the liquid crystal panel 10 and a light source 30. The light source 30 is an LED (Light Emitting Diode). Alternatively, the light source 30 may be a halogen lamp or a Xenon lamp.

A plurality of segments SEG1 to SEG9 are provided in the liquid crystal panel 10. The segments SEG1 to SEG9 are each a liquid crystal cell. The segments SEG1 to SEG9 are arranged in a 3×3 matrix, for example, but the arrangement is not limited thereto. The driving circuit 20 controls turning on or off of each of the segments SEG1 to SEG9. Here, "being turned on" means a transmissive state, and "being turned off" means a blocking state. The light source 30 emits light toward the liquid crystal panel 10, the light passes through the liquid crystal cells that are turned on, and the light is emitted toward an object to be illuminated by the headlight 1000. The liquid crystal cells that are turned off block the light from the light source 30. That is, each of the segments SEG1 to SEG9 functions as a shutter. The light distribution of the headlight 1000 changes in accordance with the on/off state of the segments SEG1 to SEG9. For example, as a result of the driving circuit 20 turning off the segments SEG1 to SEG3 and turning on the segments SEG4 to SEG9, a so-called low beam can be realized. Also, as a result of the driving circuit 20 turning on the segments SEG1 to SEG9, a so-called high beam can be realized.

Note that the application example of the liquid crystal shutter is not limited to the headlight. For example, a display module including the liquid crystal shutter may be combined with an active matrix type display device. In this case, a segment is provided in the liquid crystal panel 10 so as to cover the screen of the active matrix type display device, and the segment function as a liquid crystal shutter. Segments corresponding to various display items may be provided in the liquid crystal panel other than the segment that functions as the liquid crystal shutter. The liquid crystal device and the active matrix type display device are arranged such that a user views the active matrix type display device through the liquid crystal shutter. Also, as a result of the driving circuit 20 turning on the liquid crystal shutter, the user can view the display of the active matrix type display device through the liquid crystal shutter. Also, as a result of the driving circuit 20 turning off the liquid crystal shutter, the display of the active matrix type display device is blocked by the liquid crystal shutter, and the user cannot view the display.

Figure 16:
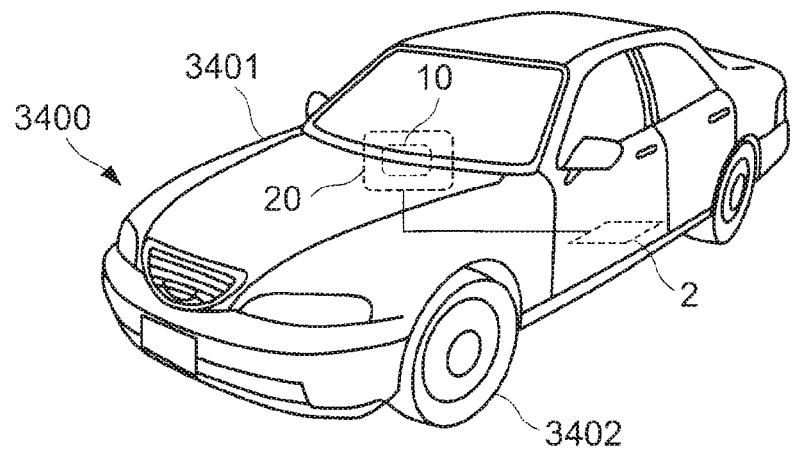
FIG. 16 is a schematic diagram of a mobile body, which is an application example.

(2) FIG. 16 illustrates an exemplary configuration of a mobile body to which the display module 1 has been applied. The mobile body is an apparatus or a device that includes a drive mechanism such as an engine or a motor, steering mechanisms such as a steering wheel or a rudder, and various electronic apparatuses, for example, and moves on the ground, in the air, and on the sea. A car, an airplane, a motorcycle, a ship, a robot, or the like can be envisioned as the mobile body. FIG. 16 schematically illustrates an automobile 3400 serving as a specific example of the mobile body. The automobile 3400 includes a car body 3401 and wheels 3402. The liquid crystal panel 10, the drive circuit 20, and the host processor 2 that controls the units of the automobile 3400 are incorporated in the automobile 3400. The host processor 2 can include an ECU or the like. The liquid crystal panel 10 is a panel apparatus such as a meter panel. The host processor 2 generates an image for presenting to a user, and transmits the image to the drive circuit 20. The drive circuit 20 displays the received image in the liquid crystal panel 10. For example, pieces of information such as speed, a remaining fuel amount, a travel distance, and settings of various devices are displayed as an image.

What is claimed is:

1. A driving circuit that drives a display panel including a first electrode and a second electrode, the driving circuit comprising:
    a first voltage generation circuit configured to generate a first voltage to be supplied to the first electrode based on a first signal;
    a second voltage generation circuit configured to generate a second voltage to be supplied to the second electrode based on a second signal;
    a first output terminal to be connected to the first electrode;
    a second output terminal to be connected to the second electrode;
    a voltage output circuit that is arranged between the first voltage generation circuit and the first output terminal and between the second voltage generation circuit and the second output terminal, includes an inspection voltage output line for outputting a first inspection voltage in order to inspect an application state of the first voltage to the first electrode, and a second inspection voltage in order to inspect an application state of the second voltage to the second electrode, and is configured to, in a first period, output the first inspection voltage to the inspection voltage output line, and not output the second inspection voltage to the inspection voltage output line, and in a second period that is different from the first period, output the second inspection voltage to the inspection voltage output line, and not output the first inspection voltage to the inspection voltage output line;
    a signal output circuit that includes a signal voltage output line for outputting a voltage of the first signal or a voltage of the second signal, and is configured to, in the first period, output the voltage of the first signal to the signal voltage output line, and not output the voltage of the second signal to the signal voltage output line, and in the second period, output the voltage of the second signal to the signal voltage output line, and not output the voltage of the first signal to the signal voltage output line; and
    an inspection circuit configured to inspect, in the first period, whether or not an anomaly is present in a path from an input of the first voltage generation circuit to the first electrode, and in the second period, whether or not an anomaly is present in a path from an input of the second voltage generation circuit to the second electrode, based on the first inspection voltage or the second inspection voltage that is output from the inspection voltage output line and the voltage of the first signal or the voltage of the second signal that is output from the signal voltage output line.

2. The driving circuit according to claim 1,
wherein the voltage output circuit includes:
a first inspection switch provided between the inspection voltage output line and the first output terminal; and
a second inspection switch provided between the inspection voltage output line and the second output terminal,
in the first period, the first inspection switch is turned on and the second inspection switch is turned off, and
in the second period, the second inspection switch is turned on and the first inspection switch is turned off.

3. The driving circuit according to claim 2,
wherein the signal output circuit includes:
a first signal switch provided between the signal voltage output line and an input terminal of the first voltage output circuit; and
a second signal switch provided between the signal voltage output line and an input terminal of the second voltage output circuit,
in the first period, the first signal switch is turned on and the second signal switch is turned off, and
in the second period, the second signal switch is turned on and the first signal switch is turned off.

4. The driving circuit according to claim 3, further comprising:
a first monitor terminal to be connected to the first electrode through a first monitor line for monitoring the first voltage; and a second monitor terminal to be connected to the second electrode through a second monitor line for monitoring the second voltage, wherein the first output terminal and the first electrode are connected through a first output line, the second output terminal and the second electrode are connected through a second output line, the voltage output circuit includes:

a first monitor switch provided between the inspection voltage output line and the first monitor terminal; and a second monitor switch provided between the inspection voltage output line and the second monitor terminal, in the first period, the first monitor switch and the second monitor switch are turned off, in the second period, the first monitor switch and the second monitor switch are turned off, in a third period that is different from the first period and the second period, the first monitor switch is turned on, and the first inspection switch, the second inspection switch, and the second monitor switch are turned off, in a fourth period that is different from the first period, the second period, and the third period, the second monitor switch is turned on, and the first inspection switch, the second inspection switch, and the first monitor switch are turned off.

5. The driving circuit according to claim 4, wherein, in the third period, the first signal switch is turned on, and the second signal switch is turned off, and in the fourth period, the second signal switch is turned on, and the first signal switch is turned off.

6. The driving circuit according to claim 1, wherein the driving circuit is formed in an IC chip having a rectangular shape, and the inspection voltage output line and the signal voltage output line are arranged along one long side of the IC chip.

7. The driving circuit according to claim 1, wherein the driving circuit is formed in an IC chip having a rectangular shape, and the inspection circuit is arranged between the inspection voltage output line and one short side of the IC chip, and between the signal voltage output line and the one short side.

8. The driving circuit according to claim 1, wherein the driving circuit is formed in an IC chip having a rectangular shape, and the first voltage generation circuit and the second voltage generation circuit are arranged between the signal output circuit and the voltage output circuit in a first direction directed from one long side toward the other long side of the IC chip.

9. The driving circuit according to claim 1, further comprising:

a first selection circuit configured to select one PWM signal from a plurality of PWM signals based on first data indicating a tone to be displayed in a region corresponding to the first electrode, and output the selected one PWM signal as the first signal, and a second selection circuit configured to select one PWM signal from the plurality of PWM signals based on second data indicating a tone to be displayed in a region corresponding to the second electrode, and output the selected one PWM signal as the second signal.

10. A display module comprising:

a display panel including a first electrode and a second electrode, and the driving circuit according to claim 1.

11. A mobile body comprising the display module according to claim 10.

* * * * *